United States Patent
Shibuya et al.

(10) Patent No.: US 9,841,182 B2
(45) Date of Patent: Dec. 12, 2017

(54) STEAM GENERATOR AND HEATING COOKER COMPRISING STEAM GENERATOR

(71) Applicant: Panasonic Corporation, Kadoma-shi, Osaka (JP)

(72) Inventors: Masaki Shibuya, Osaka (JP); Hiroshi Kawai, Shiga (JP); Yuji Hayakawa, Shiga (JP); Kuniaki Abe, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 470 days.

(21) Appl. No.: 14/384,623

(22) PCT Filed: Mar. 12, 2013

(86) PCT No.: PCT/JP2013/001608
§ 371 (c)(1),
(2) Date: Sep. 11, 2014

(87) PCT Pub. No.: WO2013/136773
PCT Pub. Date: Sep. 19, 2013

(65) Prior Publication Data
US 2015/0083110 A1    Mar. 26, 2015

(30) Foreign Application Priority Data
Mar. 15, 2012    (JP) .................................. 2012-058282

(51) Int. Cl.
*F22B 1/28*    (2006.01)
*F22B 37/50*    (2006.01)
(Continued)

(52) U.S. Cl.
CPC ............... *F22B 1/284* (2013.01); *A47J 27/04* (2013.01); *F22B 1/28* (2013.01); *F22B 1/285* (2013.01);
(Continued)

(58) Field of Classification Search
None
See application file for complete search history.

(56) References Cited

U.S. PATENT DOCUMENTS 4,991,545 A * 2/1991 Rabe ....................... A47J 27/04
122/379
7,326,893 B2    2/2008 Kanzaki et al.
(Continued)

FOREIGN PATENT DOCUMENTS

CN    2355254 Y    12/1999
CN    101063545 A    10/2007
(Continued)

OTHER PUBLICATIONS

Office Action and Search Report, and partial English language translation thereof, in corresponding Chinese Application No. 201380025305.1, dated Jul. 8, 2015, 10 pages.
(Continued)

*Primary Examiner* — Gregory Huson
*Assistant Examiner* — Martha Becton
(74) *Attorney, Agent, or Firm* — Brinks Gilson & Lione (57) ABSTRACT

A steam generator comprises a water storage chamber which stores water, a steam generating heater which heats water in the water storage chamber, a water supply pump which supplies water stored in a water supply tank through a water supply port provided in the water storage chamber and a water supply passage, a discharge passage which discharges water formed with a first water discharge passage having a U shape to be convex downward, which is in fluid commu-
(Continued)

nication with a discharge port provided in the water storage chamber, and a second water discharge passage having an inverted U shape to be convex upward, and configured such that water stored in the water storage chamber is discharged through the discharge port and the water discharge passage according to the theory of a siphon, wherein the first water discharge passage is formed by a nonmetallic material.

13 Claims, 7 Drawing Sheets

(51) Int. Cl.
    *A47J 27/04*     (2006.01)
    *F22B 37/54*     (2006.01)
    *F24C 15/00*     (2006.01)
(52) U.S. Cl.
    CPC .............. *F22B 37/50* (2013.01); *F22B 37/54* (2013.01); *F24C 15/003* (2013.01); *A47J 2027/043* (2013.01)

(56) References Cited

U.S. PATENT DOCUMENTS

| | | | | |
|---|---|---|---|---|
| 7,967,002 | B2* | 6/2011 | Inada | F24C 15/327 126/19 R |
| 8,695,487 | B2* | 4/2014 | Sakane | F24C 15/327 126/369 |
| 2006/0291828 | A1 | 12/2006 | Kadoma et al. | |
| 2007/0183555 | A1* | 8/2007 | Kaneko | A21B 3/04 376/258 |
| 2014/0013963 | A1* | 1/2014 | Hoffmann | F24C 15/2007 99/403 |

FOREIGN PATENT DOCUMENTS

| | | |
|---|---|---|
| CN | 201137919 Y | 10/2008 |
| CN | 101743438 A | 6/2010 |
| JP | 1-169204 A | 7/1989 |
| JP | 10-267210 A | 10/1998 |
| JP | 2002-130990 A | 5/2002 |
| JP | 2005-83708 A | 3/2005 |
| JP | 2010-54096 A | 3/2010 |
| WO | WO 2008/139205 A2 | 11/2008 |
| WO | WO 2008/139205 A3 | 11/2008 |

OTHER PUBLICATIONS

Extended European Search Report in corresponding European Application No. 13760497.1, dated Jul. 10, 2015, 6 pages.
International Preliminary Report on Patentability in corresponding International Application No. PCT/JP2013/001608, dated Sep. 18, 2014, 6 pages.
International Search Report in corresponding International Application No. PCT/JP2013/001608, dated May 28, 2013, 2 pages.

* cited by examiner

STEAM GENERATOR AND HEATING COOKER COMPRISING STEAM GENERATOR

This application is a 371application of PCT/JP2013/001608 having an international filing date of Mar. 12, 2013, which claims priority to JP2012-058282 filed Mar. 15, 2012, the entire contents of which are incorporated herein by reference.

TECHNICAL FIELD

The present invention relates to a steam generator and a heating cooker comprising the steam generator.

BACKGROUND ART

Conventionally, a steam generator is configured to have a first tank used as a liquid supply source, a second tank which is a vaporizing chamber, a liquid supply pipe which supplies liquid from the first tank to the second tank, and a liquid discharge pipe which discharges liquid from the second tank to the first tank. In the conventional steam generator having the above-mentioned configuration, a cleaning operation is performed to remove scales adhered to an inside of the second tank. During the cleaning operation, liquid is supplied to the second tank until a liquid level of the second tank reaches a level which exceeds an upmost point of the bended liquid discharge pipe, and then the liquid in the second tank is discharged to the first tank according to the principal of a syphon, and thereby discharging the scales in the second tank (refer to Unexamined Japanese Patent Publication No. 2010-54096 (Patent Literature 1)). While a material of the liquid discharge pipe is not clearly described, one formed by bending a metallic pipe is generally used for such liquid discharge pipe.

CITATION LIST

Patent Literatures

Patent Literature 1: Unexamined Japanese Patent Publication No. 2010-54096

SUMMARY OF THE INVENTION

Technical Problem

In the aforementioned conventional steam generator, since the scale components adhered to the inside of the second tank are composed of inorganic substances such as calcium carbonate, magnesium carbonate or the like, the scale components have a strong bonding force with a metallic material. Accordingly, the scale components also tend to be adhered to the liquid discharge pipe composed of a metallic material. Particularly, in the liquid discharge pipe made of a metallic material, since a U shape portion having a U shape to be convex downward is provided at a lower side of the second tank structurally, the U shape portion has a construction where scales precipitated in the second tank during steam generation are likely to be deposited and accumulated therein. Therefore, the conventional steam generator has a problem such that scales are gradually adhered to the inside of the liquid discharge pipe for long term use, and thereby finally causing inability of liquid discharge. Consequently, the scales are also deposited in the second tank, and thereby causing inability of steam generation.

The present invention is made to overcome the aforementioned problems in a conventional steam generator and aims at providing a steam generator which can keep unchanged good performance for generating steam in spite of long term use, and a heating cooker provided with such steam generator.

Solution to Problem

A steam generator according to the present invention including:
a water storage chamber which stores water,
a heating portion which heats water in said water storage chamber,
a water supply device which supplies water stored in a water supply tank through a water supply port provided in said water storage chamber and a water supply passage, and
a water discharge passage which discharges water stored in said water storage chamber, wherein
said water discharge passage has a first water discharge passage having a U shape to be convex downward, which is in fluid communication with a discharge port provided in said water storage chamber, and a second water discharge passage having an inverted U shape to be convex upward, which is consecutively formed with said first water discharge passage,
said steam generator is configured such that water stored in said water storage chamber is discharged through said discharge port and said water discharge passage according to the theory of a siphon, by making said water supply device operate for pushing up a water level of water stored in said water storage chamber to a water discharge passage upmost point which is located upper than a position of a water level stored in said water storage tank during normal heating process, and
at least an inner surface of said first water discharge passage is formed by a nonmetallic material.

According to the present invention having the aforementioned configuration, since at least the inner surface of the first water discharge passage in which scales are likely to be deposited and accumulated structurally is formed by a nonmetallic material, bonding force of the first water discharge passage with scales is weak, and scales do not adhere to the first water discharge passage. Accordingly, when water is discharged according to the principal of a syphon, scales can easily be discharged, and thereby achieving to provide the steam generator whose steam generation performance is not lowered in spite of long term use.

Advantageous Effects of Invention

In the steam generator according to the present invention, sales is hardly adhered to the inner surface of the water discharge passage, and unchanged good performance for generating steam can be kept in spite of long term use.

DETAILED DESCRIPTION OF THE PREFERRED EMBODIMENTS

A steam generator according to a first aspect of the present invention comprises:

a water storage chamber which stores water, a heating portion which heats water in said water storage chamber, a water supply device which supplies water stored in a water supply tank through a water supply port provided in said water storage chamber and a water supply passage, and a water discharge passage which discharges water stored in said water storage chamber, wherein said water discharge passage has a first water discharge passage having a U shape to be convex downward, which is in fluid communication with a discharge port provided in said water storage chamber, and a second water discharge passage having an inverted U shape to be convex upward, which is consecutively formed with said first water discharge passage, said steam generator is configured such that water stored in said water storage chamber is discharged through said discharge port and said water discharge passage according to the theory of a siphon, by making said water supply device operate for pushing up a water level of water stored in said water storage chamber to a water discharge passage upmost point which is located upper than a position of a water level stored in said water storage tank during normal heating process, and at least an inner surface of said first water discharge passage is formed by a nonmetallic material.

In the steam generator according to the first aspect of the present invention, having the aforementioned configuration, since at least the inner surface of the first water discharge passage in which scales are likely to be deposited and accumulated structurally is formed by a nonmetallic material, bonding force of the first water discharge passage with scales is weak, and scales do not adhere to the first water discharge passage. Accordingly, when water is discharged according to the principal of a syphon, scales can surely be discharged, and thereby achieving to provide the steam generator whose steam generation performance is not lowered in spite of long term use.

In the steam generator according to a second aspect of the present invention, particularly in said first aspect of the present invention, at least said first water discharge passage of said water discharge passage is formed by a nonmetallic material. In the steam generator according to the second aspect of the present invention, having the above-mentioned configuration, at least the first water discharge passage in which scales are likely to be deposited and accumulated structurally is formed by a nonmetallic material. Accordingly, when water is discharged according to the principal of a syphon, scales can surely be discharged, and thereby achieving to provide the steam generator whose steam generation performance is not lowered in spite of long term use.

According to the steam generator according to a third aspect of the present invention, particularly in said first or second aspect of the present invention, at least said first water discharge passage of said water discharge passage is formed by a nonmetallic material, and said first water discharge passage is formed by a transparent material to allow visual observation of an inside condition of said first water discharge passage. In the steam generator according to the third aspect of the present invention, having the above-mentioned configuration, a user can check a degree of accumulation of deposited scales in the first waste water passage visually, and then operates for discharging water. Thus, it can delete the useless activity such that water discharge process is performed in spite of the condition that scales have not been accumulated. Accordingly, when water is discharged according to the principal of a syphon, scales can surely be discharged, and thereby achieving to provide the steam generator whose steam generation performance is not lowered in spite of long term use.

In the steam generator according to a fourth aspect of the present invention, particularly in any one of said first to third aspects of the present invention, said second water discharge passage is formed by a metallic material. In the steam generator according to the fourth aspect of the present invention, having the above-mentioned configuration, the second water discharge passage can be configured to be fixed easily to a device main body and manufactured at low cost by making the second water discharge passage formed by a metallic material.

In the steam generator according to a fifth aspect of the present invention, particularly in any one of said first to fourth aspects of the present invention, at least said first water discharge passage of said water discharge passage is formed by a nonmetallic material, and said first water discharge passage is formed by an elastic body. In the steam generator according to the fifth aspect of the present invention, having the above-mentioned configuration, the discharge port which connects the first water discharge passage and the water storage chamber, and the connecting portion which connects the water storage chamber and the second discharge passage can be constructed without using another part such as a tube. Accordingly, it can be configured to avoid water leakage or the like due to the increase of the number of parts, and thereby achieving the steam generator with high reliability which is manufactured at low cost.

According to the steam generator according to a sixth aspect of the present invention, particularly in any one of said first to fifth aspects of the present invention, a nonmetallic coating layer is formed on the inner surface of said first water discharge passage. In the steam generator according to the sixth aspect of the present invention, having the above-mentioned configuration, it can prevent scales from being adhered to the first water discharge passage with a simple construction even if the first water discharge passage has to be formed by a metallic material according to the reason for heat resistance or the like.

In a heating cooker according to a seventh aspect of the present invention is provided with the steam generator according to any one of said first to sixth aspects of the present invention. In the heating cooker according to the seventh aspect of the present invention, having the above-mentioned configuration, since at least the first water discharge passage in which scales are likely to be deposited and accumulated is formed by a nonmetallic material, bonding force of the first water discharge passage with scales tends to be weak, and there is no adhesion problem between the first water discharge passage and scales. Accordingly, when water is discharged according to the principal of a syphon, scales can be discharged at the same time, and thereby achieving to provide the steam generator whose steam generation performance is not lowered in spite of long term use.

Hereinafter, preferred embodiments of a heating cooker comprising a steam generator according to the present invention will be described, with reference to the accompanying drawings. The present invention is not limited to configuration of a heating cooker comprising a steam generator hereinafter described in the embodiments, and includes a steam generator and a heating cooker comprising a steam generator configured based on technical concepts similar to the technical concepts as described in the following embodiments.

(First Embodiment)

Figure 1:
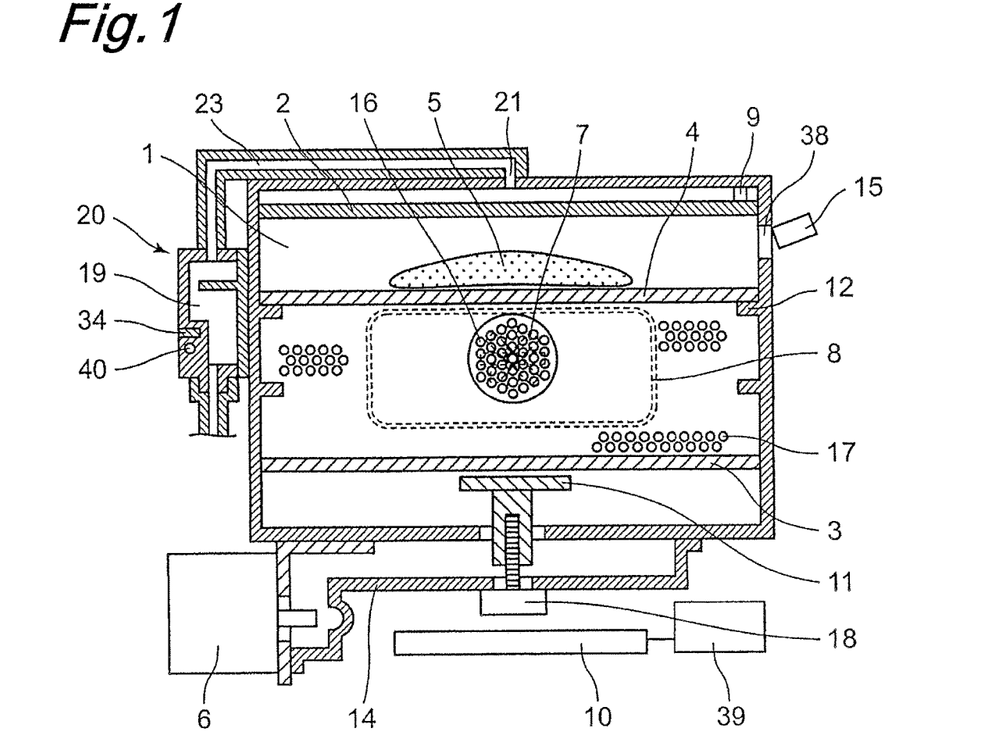
FIG. 1 is a front cross-sectional view illustrating a heating cooker comprising a steam generator according to the first embodiment of the present invention.

FIG. 1 is a front cross-sectional view illustrating a heating cooker comprising a steam generator according to the first embodiment of the present invention.

In FIG. 1, the heating cooker according to the first embodiment has a heating chamber 1 which is formed from an aluminum-plated steel plate coated with fluorine, and within which a food 5 as an object to be heated is housed. The heating chamber 1 is provided with a mounting plate 4 which mounts the food 5 thereon and can be taken into or out of the heating chamber 1, rails 12 which support the mounting plate 4, a mounting table 3 formed with crystallized glass which is fixed to the heating chamber 1 and mounts the food 5 thereon, and heating chamber heaters 2 provided near a ceiling of the heating chamber 1 such that three heaters are arranged in parallel. A peak value of wavelength of the heating chamber heater 2 located at the center of the three heating chamber heaters 2 is set lower than a peak value of the other two heating chamber heaters 2.

A wall surface forming the heat chamber 1 is grounded by electrical connection with an earth cable (not illustrated), and the rails 12 which are formed integrally with the heating chamber 1 are also grounded.

While there has been described an example where the wall surface forming the heat chamber 1 according to the first embodiment is applied with a fluorine coating which can be easy to wipe off dirt, a porcelain enamel coating or other heat-resistant coatings can also be applied. Further, while there has been described an example where the aluminum-plated steel plate is used as a material of the heating chamber 1, other metallic materials such as a stainless steel material can also be used.

The mounting plate 4 is formed by an aluminum-plated steel plate, and is formed to have a concavo-convex shape with press working to make oil and fat contents from the food 5 flow out.

A fluorine coating is applied to a surface of the mounting plate 4, and a heat generating element which generates heat by absorbing microwaves is provided on a rear surface of the mounting plate 4. Accordingly, by providing the heat generating element on the rear surface of the mounting plate 4, the food 5 can be heated from both sides with combination of the heating chamber heater 2 located above the food 5 and the heat generating element on the rear surface of the mounting plate 4. Castings of PPS resin material are provided at the connecting portions between the mounting plate 4 and the rails 12 in order to insulate from the heating chamber 1.

In the first embodiment, while there has been described an example where the surface of the mounting plate 4 is applied with the fluorine coating which can be easy to wipe off dirt, a porcelain enamel coating or other heat-resistant coatings can also be applied. Further, while there has been described an example where the aluminum-plated steel plate is used as a material of the heating chamber 1, other metallic materials such as a stainless steel material can also be used.

At the rear side, which is back side of the heating chamber 1, a circulation fan 7 which stirs and circulates air in the heating chamber 1 and a convection heater 8 which is an interior heater heating up air circulating in the heating chamber 1 are provided such that the circulation fan 7 is surrounded by the convection heater 8. Near the center of the rear side of the heating chamber 1, a plurality of intake vent holes 16 for drawing air from the heating chamber 1 side to the circulation fan 7 side are formed. On the contrary, a plurality of blow vent holes 17 for blowing air from the circulation fan 7 side to the heating chamber 1 side are formed at the specific area in the periphery of the convection heater 8 at the rear side of the heating chamber 1. The forming area of the intake vent holes 16 and the blow vent holes 17 are distinguished each other. Each of vent holes 16, 17 are formed with a number of punch holes.

In the heating cooker according to the first embodiment, as illustrated in FIG. 1, a detection hole 38 is formed at the right side wall (right wall surface) constructing the heating chamber 1, and the heating cooker according to the first invention is configured such that temperature of the food 5 in the heating chamber 1 is measured by an infrared sensor 15, and inside temperature of the heating chamber 1 is measured by an inside thermistor 9 provided at the upper side of the heating chamber 1.

In the heating cooker according to the first embodiment illustrated in FIG. 1, a magnetron 6 which is a means for generating microwaves is provided under the left wall surface located at the lower side of the heating chamber 1 such that its output terminal is extended horizontally. The magnetron 6 used in the first embodiment has a square shape with a dimension about 80 mm×80 mm when seeing from the left side of FIG. 1. The magnetron 6 is connected to a waveguide 14 having an inside channel with an approximate L shape obtained by bending an aluminum-plated steel plate just below the bottom surface of the heating chamber 1. The output terminal of the magnetron 6 extended horizontally extends into the waveguide 14, therefore, it is configured such that microwaves are propagated through the inside channel of the waveguide 14.

A rotational antenna 11 formed by an aluminum material is provided near the center of the heating chamber 1, and the rotational antenna 11 is protruded into the heating chamber 1 from the inside of the waveguide 14 located just below the bottom surface of the heating chamber 1 through an opening. The rotational antenna 11 is configured to rotate by a motor 18, and has a function as a means for stirring microwaves emitted from the waveguide 14 into the heating chamber 1.

While the first embodiment is configured such that the magnetron 6, the rotational antenna 11, the motor 18 and waveguide 14 are provided at the lower side of the heating chamber 1, the present invention is not limited to this configuration. These elements can also be provided at the upper side or at the lateral side of the heating chamber 1, and relating to a direction for installation, each element can be installed in any direction corresponding to the element.

The heating cooker according to the first embodiment having the aforementioned configuration is provided with a steam generator 20. As illustrated in FIG. 1, a water storage chamber 19 which stores water for generating steam in the steam generator 20, and a steam generating heater 40 which is a heating portion for generating steam in the water storage chamber 19 by heating the water storage chamber 19 are provided at the left side of the heating chamber 1 when seeing from the front of the heating cooker. A water storage chamber thermistor 34 for measuring temperature in the water storage chamber 19 is arranged adjacent to the upper side of the steam generating heater 40.

A steam conduit passage 23 is connected to the top surface of the water storage chamber 19 to be extended in the upper direction. The steam conduit passage 23 is bent in a L shape along the outer surface of the heating chamber 1 after being extended from the water storage chamber 19 in the upper direction, and then connected to the place about a center portion of the top surface of the heating chamber 1 through a steam spout port 21. The steam conduit passage 23 has a pipe like shape with a diameter of 10 mm, and is configured to make steam generated in the water storage chamber 19 spout into the heating chamber 1 through the steam spout port 21 located about the center of the top surface of the heating chamber 1. A shape of the top surface of the water storage chamber 19 in the steam generator according to the first embodiment can be a dome like shape in which a center portion is raised, and it is possible to send out steam generated in the water storage chamber 19 with high efficiency by placing the steam conduit passage 23 in the center portion.

The water storage chamber 19 is formed by combining two aluminum die cast parts and configured such that the aluminum die cast parts are fixed with intervening a packing (not illustrated) between them for avoiding leakage of steam. The steam generating heater 40 is provided by being integrally molded with the aluminum die cast of the water storage chamber 19. A packing (not illustrated) is inserted in the connection portion between the heating chamber 1 and the steam spout port 21 in order to prevent water or steam from leaking between the heating chamber 1 and the steam spout port 21.

In the heating cooker according to the first embodiment, while there has been described an example where the steam conduit passage 23 which is extended from the top surface of the water storage chamber 19 in the upper direction is formed in a pipe like shape with a circular sectional shape, the steam conduit passage 23 can also have an elliptic sectional shape or an oblong sectional shape. Further, while there has been described an example where only one steam spout port 21 is provided about the center of the top surface of the heating chamber 1, it can also have configuration such that the steam spout port 21 is provided in the side surface or the bottom surface to supply steam into the heating chamber 1, and not only one but also a plurality of the ports can be provided. It is preferable that a maximum inner dimension of a hole for the steam spout port 21 is a half or less of wavelength of microwaves. In configuration of the first embodiment, the maximum inner dimension of a hole for the steam spout port 21 is preferably 60 mm or less because the wavelength of microwaves is about 120 mm.

In the heating cooker according to the first embodiment, a control portion 10 is provided below the waveguide 14, and the control portion 10 controls the magnetron 6, the motor 18, each heater or the like according to the cooking menu selected by a user.

Figure 2:
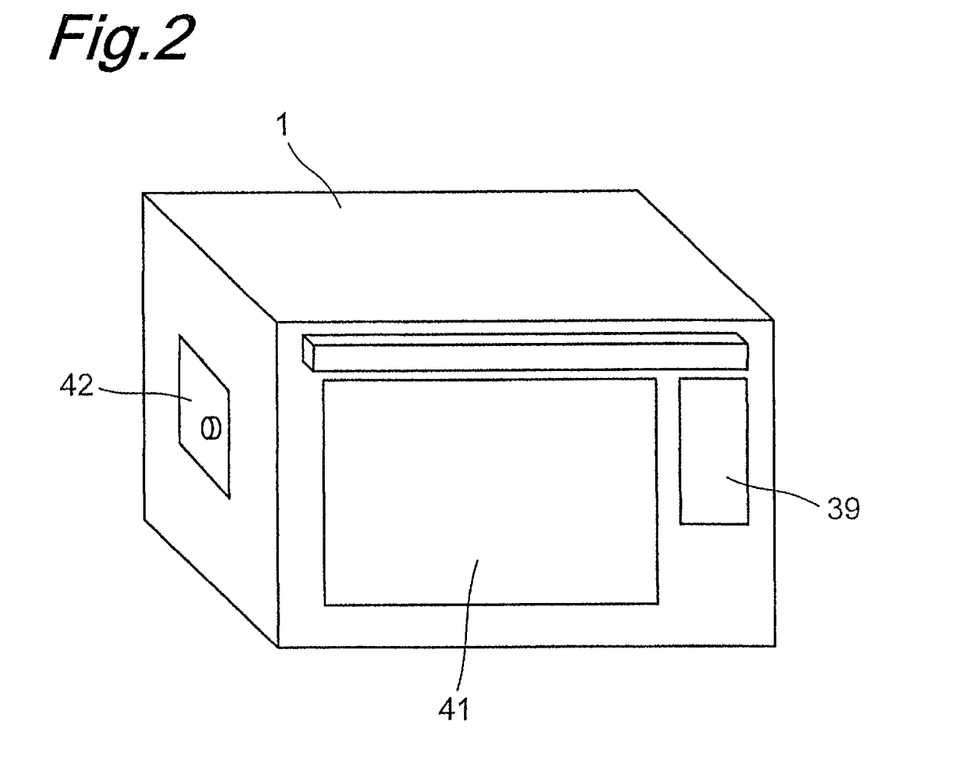
FIG. 2 is a perspective view illustrating an exterior of a steam generator according to the first embodiment of the present invention.

FIG. 2 is a perspective view illustrating an exterior of the steam generator according to the first embodiment of the present invention. A door 41 is provided in the front surface of the heating cooker according to the first embodiment 1. The door 41 is configured to be opened toward near side by using the bottom surface side as a fulcrum, and configured such that the food 5 as an object to be heated can be taken into or out of the heating chamber 1. An operational display portion 39 with which a user sets cooking menus or cooking times is provided in the front surface of the heating cooker. As illustrated in FIG. 2, an openable and closable door 42 is provided in the left side surface of the heating cooker. A user can see the steam generator 20 provided in the heating cooker by opening the door 42. Further, the heating cooker according to the first embodiment is provided with a safety switch (not illustrated) for stopping operation of the steam generating heater 40 when the door 42 is opened.

In the structure of the first embodiment, while there has been described an example where the openable and closable door 42 is used, it can be configured to provide punched holes, a transparent window or the like instead of the door 42, to enable a user to see the steam generator 20.

Figure 3:
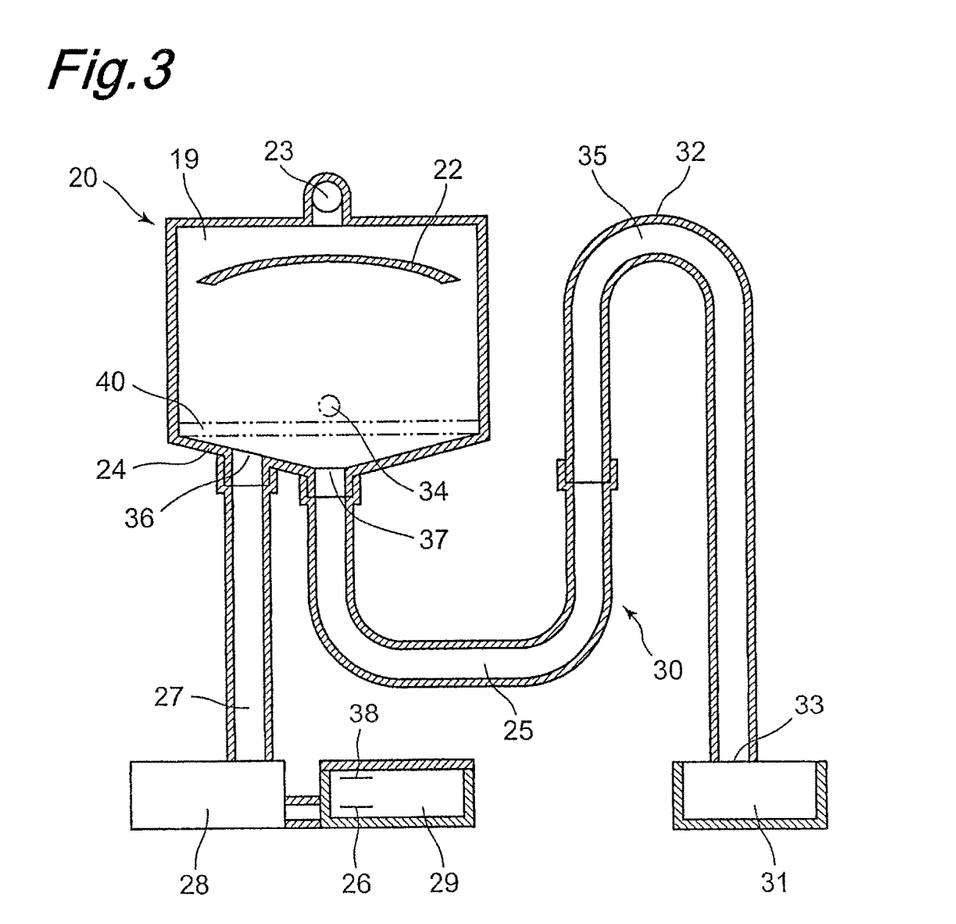
FIG. 3 is a schematic cross-sectional view showing configuration of a steam generator according to the first embodiment of the present invention.

FIG. 3 is a schematic cross-sectional view showing configuration of the steam generator according to the first embodiment of the present invention. FIG. 3 is for the purpose simply to illustrate connecting relation of the main elements of steam generator according to the first embodiment, and a shape and a size (capacity) of each element does not correspond to the actual one.

A partition plate 22 having about circular shape to be convex upward in a vertical sectional shape is provided in the water storage chamber 19, and a center of the concave surface side of the partition plate 22, which is a lower surface side of the partition plate 22, is placed just below a center of the upper surface in the inner surface of the water storage chamber 19. Further, one steam generating heater 40, which is a straight sheathed heater with 1000 W output, is provided at the lower side of the water storage chamber 19, which is below the partition plate 22.

In the first embodiment, while there has been described an example where one straight heater with 1000 W output is used as a steam generating heater 40 which is a heating portion, it is also be configured such that a heater with any desirable output can be provided according to a shape of the water storage chamber 19 or required steam amount in the specification of the heating cooker, further a plurality of heaters with the same output or with different output can be provided. Further, heaters with any kind of shapes other than the straight shape heaters can be used according to the shape of the water storage chamber 19 or the like, and for example, a heater with a U shape or the like can be used.

The bottom surface in the inner surface of the water storage chamber 19 is configured to have a sloping surface 24 with a sloping angle of about 20 degrees relative to the horizontal plane, whose center portion is located at the lowest end. Thus, the bottom surface of the water storage chamber 19 is formed in a so called funnel shape, and a discharge port 37 is provided at the lowest end, which is the center portion. A water supply port 36 which supplies water to the water storage chamber 19 is formed in the sloping surface 24 of the water storage chamber 19. The water supply port 36 is placed at left side of the discharge port 37 in FIG. 3. The water supply port 36 and the discharge port 37 are formed in the different position of the bottom surface of the water storage chamber 19.

While the sloping angle of the sloping surface 24 according to the first embodiment is set about 20 degrees relative to horizontal plane, the sloping angle can be determined according to the required water flow in the specification of the heating generator because water flow is different according to a shape of the water storage chamber 19, amount of water flow during water discharge or the like.

In FIG. 3, one end of a translucent water supply passage 27 formed with a silicone material, which is an elastic body, with an inner diameter of 6 mm is connected to an upstream side which is located below the water supply port 36. The other end of the water supply passage 27 is connected to the water supply tank 29 via a water supply pump 28, which is a water supply device. In the structure of the first embodiment, while there has been described an example where the water supply pump 28 is used as a water supply device, it can also use a water supply means such that electrically driven or hand-driven valve is installed in a water supply passage using gravity and water is supplied by opening the valve, and any configuration to supply water into the water storage chamber 19 is applicable.

On the contrary, a water discharge passage 30 in which a first water discharge passage 25 and a second water discharge passage 35 are connected consecutively is provided in the downstream side, which means below the discharge port 37. The first water supply passage 25 is translucent and formed with a silicone material which is an elastic body, and has a pipe like shape with an inner diameter of 6 mm. The first water discharge passage 25 is connected to the discharge port 37 without using another part such as a tube. As illustrated in FIG. 3, the first water discharge passage 25 is extended downward (in approximately vertical direction) from the discharge port 37, and bent toward approximately horizontal direction at a predetermined length from the discharge port 37, then bent toward upward (in approximately vertical direction) at a further predetermined length. Thus, the first water discharge passage 25 has so called a U shape to be convex downward.

While there has been described an example where a silicone material is used as the material of the first water discharge passage 25 according to the first embodiment, it can also use a material such as fluorine, polypropylene, polyethylene or the like. A metallic pipe can be used for the first water discharge passage 25 with applying a coating with a material such as fluorine, silicone or the like to at least an inner surface of the first water discharge passage 25.

The second water discharge passage 35 is connected to a downstream side of the first water discharge passage 25 without using another part such as a tube. The second water supply passage 35 is extended upward from the connecting portion with the first water discharge passage 25 and further extended beyond the horizontally same level of the steam generating heater 40. The second water discharge passage 35 is bent with 180 degrees at a water discharge passage upmost point 32, as an apex of a U shape, which is located about at the same level as an upmost point of the top surface in the inner surface of the water storage chamber 19. The second water discharge passage 35 located at downstream side of water discharge passage upmost point 32 extends vertically downward. Thus, the second water discharge passage 35 has so called an inverted U shape to be convex upward. The second water supply passage 35 as formed so far is configured to supply water which flows from the first water supply chamber 25 to a water discharge tank 31 through a water supply passage outlet 33. The water supply passage outlet 33 of the water supply passage 35 is provided at the position lower than the bottom surface of the water storage chamber 19.

In the first embodiment, while there has been described an example where the second water discharge passage 35 is configured to use a copper pipe, it can also use a pipe made of a material such as aluminum, iron or the like.

A water supply tank 29 is formed by two parts, a container portion and a lid portion, and each of them is formed with an AS resin material, which is a transparent amorphous plastic material. The container portion and the lid portion are hermetically connected by intervening a packing (not illustrated) between them to avoid water leakage. A water discharge line 26 and a full of water line 38 are indicated by silkscreen on the side surface of the water supply tank 29. When water is supplied to the water discharge line 26 of the water supply tank 29, a volume of water in the water supply tank 29 becomes 100 ml, which is 10 ml more than an inner volume of the water storage chamber 19. When water is supplied to the full of water line 38, a volume of water in the water supply tank 29 becomes 400 ml. The water storage chamber 19, the water supply tank 29 and the water discharge tank 31 illustrated in FIG. 3 do not show actual relative volumes, and the volume of the water storage chamber 19 is exaggerated compared to those of the water supply tank 29 and the water discharge tank 31.

In the first embodiment, while there has been described an example where the water discharge line 26 and the full of water line 38 are indicated by silkscreen, it is not limited to the silkscreen. The lines can be indicated by stencil onto the water supply tank 29, or by making a concavo-convex portion on the water supply tank 29.

Next, relating to the heating cooker comprising the steam generator according to the first embodiment having the aforementioned configuration, operation and function thereof will be hereinafter described.

At first, when a user selects a microwave heating mode, and turns on a start switch, the magnetron 6 generates microwaves. The microwaves emitted from the magnetron 6 are propagated through the waveguide 14 and directed to the rotational antenna 11. Then, microwaves are supplied to the inside of the heating chamber 1 while being stirred by the rotational antenna 11 which is being rotated by the motor 18. In microwaves supplied in the heating chamber 1, some of them are directly absorbed by the food 5 which is an object to be heated, and some of them are absorbed by the food 5 after reflected by the wall surface of the heating chamber 1, and thereby heating the food 5. During the operations of the microwave heating mode, the mounting plate 4 has been removed from the inside of the heating chamber 1, and the food 5 is mounted on the mounting table 3 and then heated.

On the contrary, when a user selects an oven heating mode, and turns on a start switch, a heating chamber heater 2 or a convection heater 8 is energized, and thus caused to generate heat for heating air, and heated air is circulated by the circulation fan 7, and thereby heating the food 5.

When a user places the mounting plate 4 in the heating chamber 1, and selects a grill heating mode, and turns on a start switch, microwaves are supplied to the heating chamber 1 as well as the microwave mode, and the supplied microwaves cause the heating element located at the rear side of the mounting plate 4 to generate heat. Temperature of the entire mounting plate 4 becomes high by the heat transferred from the heating element by heat conduction, and thereby heating the food 5 from the lower side. At the same time, microwaves flow round into the food 4 through the space between the mounting plate 4 and the wall surface of the heating chamber 1, and thereby heating the food 5. During the grill mode, the heating chamber heater 2 is energized and thus caused to generate heat, and the food 5 is heated from upper side by radiation heat from the heating chamber heater 2. During the grill mode, it is automatically selected according to the item selected by a user whether applying radiation heat by the heating chamber heater 2 together with heat by microwaves at the same time, or selectively applying heat by microwaves or applying radiation heat by the heating chamber heater 2 independently.

After water is refilled to the full of water line 38 of the water supply tank 29, when a steam heating mode is selected and a start switch is turned on by a user, the steam generating heater 40 in the water storage chamber 19 is energized and thus caused to generate heat. At this moment, the water storage chamber thermistor 34 detects temperature in the water storage chamber 19. Temperature in the water storage chamber 19 is raised and when temperature exceeds 50 degree Celsius, water in the water supply tank 29 is supplied to the water storage chamber 19 through the water supply passage 27 and the water supply port 36 by the water supply pump 28. When about 10 ml of water is supplied to the water storage chamber 19, the water supply pump 28 stops the water supply operation, and water which has been supplied to the water storage chamber 19 is heated by the steam generating heater 40, then vaporized. Steam generated in the water storage chamber 19 (vaporizing chamber) is spouted into heating chamber 1 from the steam spout port 21 through the steam conduit passage 23, and thereby heating the food 5.

At this moment, when water in the water storage chamber 19 is boiled, water droplets jump up together with steam. The partition plate 22, however, is provided just below the steam conduit passage 23 in the water storage chamber 19 of the steam generator 20 according to the first embodiment, and thereby preventing such jumping water droplets from entering the steam conduit passage 23 and then reaching the inside of the heating chamber 1. Further, since the first embodiment is configured such that the partition plate 22 has a circular shape to be convex upward in a vertical sectional shape, water droplets attached to the lower surface of the partition plate 22 are likely to move downward along the circular surface of the partition plate 22.

In the steam generator 20 according to the first embodiment, while there has been described an example where the partition plate 22 having a circular shape is provided, a partition plate having straight shape or an oval shape in a vertical sectional shape can also effectively prevents the jumping water droplets from entering the steam conduit passage 23 and then reaching the inside of the heating chamber 1.

In the steam generator 20 according to the first embodiment, while water is refilled to the full of water line 38, steam can be generated even without refilling water to the full of water line 38.

As described above, if water is vaporized continuously in the water storage chamber 19, a water level in the water storage chamber 19 and the water discharge passage 30 is lowered, and thus the water storage chamber 19 falls under the condition of boiling almost without water, and thereby raising temperature in the water storage chamber 19. At this moment, the water storage chamber thermistor 34 detects increase of temperature in the water storage chamber 19, and if temperature in the water storage chamber 19 exceeds 110 degree Celsius, the control portion 10 outputs an order signal for supplying water to the water supply pump 28, and thus water of about 10 ml is automatically supplied to the water storage chamber 19. If water is supplied to the water storage chamber 19 accordingly, temperature detected by the water storage chamber thermistor 34 becomes low. Then, water vaporization is performed continuously, and no water supply is performed until the water level is lowered and temperature in the water storage chamber 19 is raised. Consequently, automatic water supply can be achieved without a water level sensor by simply detecting the water level as well as the water level is maintained within a predetermined range in the water storage chamber 19. If increase of temperature in the water storage chamber 19 does not stop in spite of the order signal for supplying water from the control portion 10 to the water supply pump 28, the control portion 10 judges that there is no water in the water supply tank 28, and then stops steam generation heating and informs a user of necessity of filling water into the water supply tank 29 by indication in the operational display portion 39 as well as generating a buzzer sound (alarm sound).

FIG. 4A, FIG. 4B, FIG. 4C and FIG. 4D are cross-sectional views illustrating for describing water discharge process by using the principal of a syphon in the steam generator 20 according to the first embodiment of the present invention.

Figure 4A:
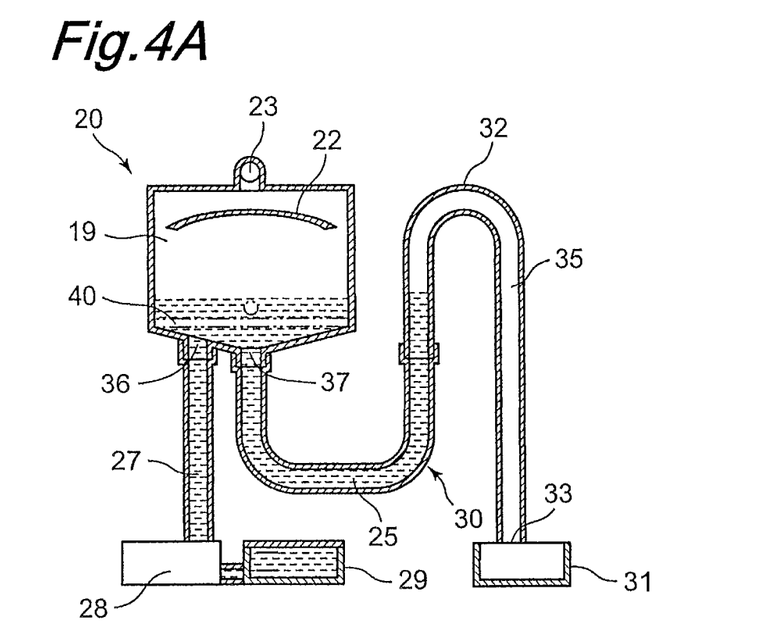
FIG. 4A is a cross-sectional view illustrating a first operation in the steam generator during a water discharge process by using the principal of a syphon according to the first embodiment of the present invention.

FIG. 4A is a cross-sectional view illustrating a first operation (steam heating operation) in the steam generator according to the first embodiment. As illustrated in FIG. 4A, in normal heating condition, water is filled to the level located upper than the position of the steam generating heater 40 in the water storage chamber 19 by water supply of the water supply pump 28, and at the same time, the water level in the water discharge passage 30 is also raised. If no steam is generated in the water storage chamber 19, the water level in the water storage chamber 19 is the same as the water level in the water discharge passage 30. On the contrary, if steam is generated in the water storage chamber 19, the water level in the water storage chamber 19 is different from the water level in the water discharge passage 30 because pressure in the water storage chamber 19 is raised, and thereby raising the water level in the water discharge passage 30.

Figure 4B:
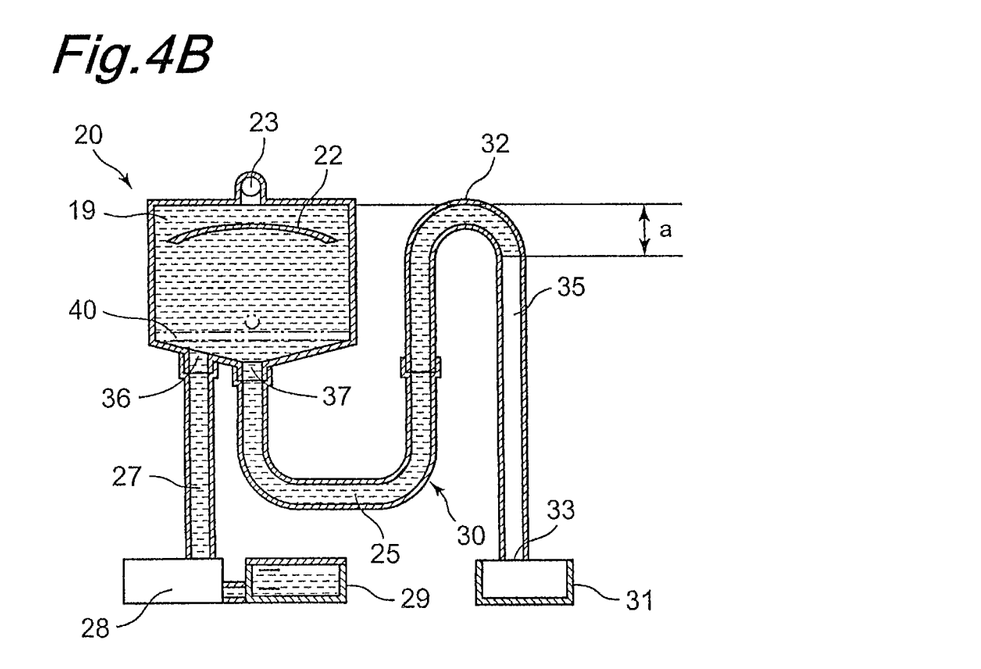
FIG. 4B is a cross-sectional view illustrating a second operation in the steam generator during the water discharge process by using the principal of a syphon according to the first embodiment of the present invention.

FIG. 4B is a cross-sectional view illustrating a second operation in the steam generator during water discharge process by using the principal of a syphon according to the first embodiment. As illustrated in FIG. 4B, after completing the steam heating operation, water is supplied to the water storage chamber 19 by automatically driving the water supply pump 28 until the water level in the water storage chamber 19 reaches the water discharge passage upmost point 32 which is located upper than the water level in the water storage chamber 19 during the normal heating condition. If the water level is raised to the water discharge passage upmost point 32, vertical difference "a" is created between the water level in the water storage chamber 19 and the water level in the water discharge passage 30.

Figure 4C:
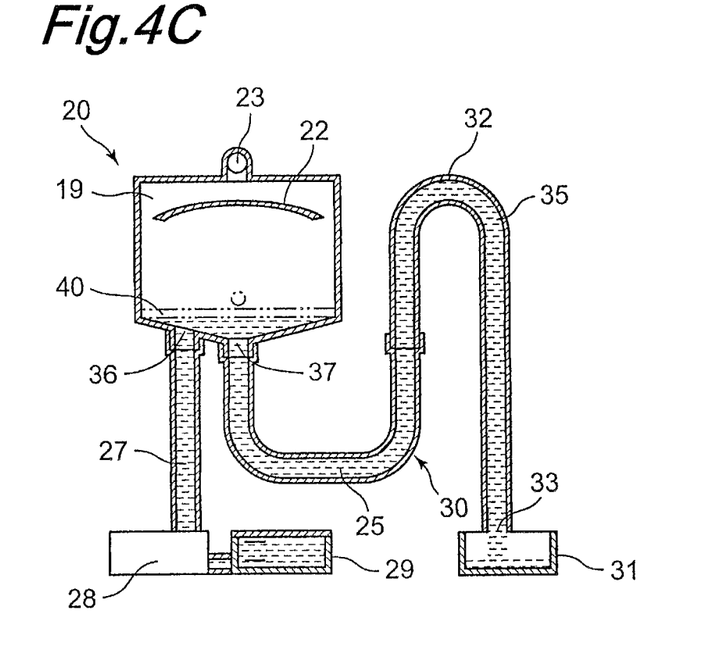
FIG. 4C is a cross-sectional view illustrating a third operation in the steam generator during the water discharge process by using the principal of a syphon according to the first embodiment of the present invention.

As illustrated in FIG. 4B, if there is vertical difference between the water level in the water storage chamber 19 and the water level in the water discharge passage 30, as illustrated in FIG. 4C, scale cohesion water or precipitated scales in the water storage chamber 19 and the first water discharge passage 25 flows to the water discharge tank 31 through the discharge port 37, the water discharge passage 30 according to the principal of a syphon. FIG. 4C illustrates a third operation in the steam generator during the water discharge process according to the principal of a syphon in the first embodiment. When vertical difference "a" is created between the water level in the water storage chamber 19 and the water level in the water discharge passage 30, water discharge starts. If the water supply flow rate is less than the water discharge flow rate, the water level in the water storage chamber 19 is not raised. Therefore, even if the water supply pump 28 supplies water at flow rate a little bit more than the water supply flow rate required for water discharge, water does not overflow from the water storage chamber 19. Accordingly, in the steam generator according to the first embodiment, operation period for the water supply pump 28 is set such that water supply rate is a little bit more than the water supply rate required for discharging water from the water storage chamber 19 considering variation in the operation of the water supply pump 28. Therefore, a means for detecting the water level in the water storage chamber 19 during discharging water can be omitted.

Figure 4D:
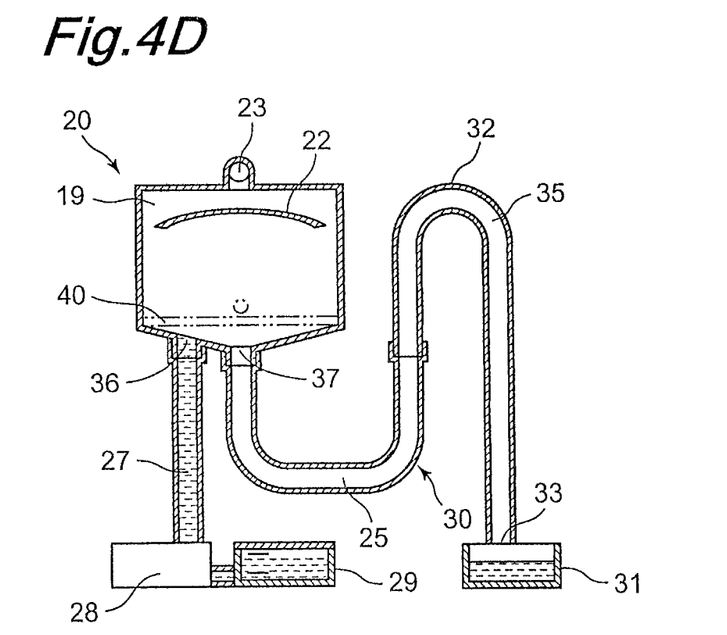
FIG. 4D is a cross-sectional view illustrating a fourth operation in the steam generator during the water discharge process by using the principal of a syphon according to the first embodiment of the present invention.

FIG. 4D is a cross-sectional view illustrating a fourth operation, which is the last operation of water discharge process, in the steam generator during water discharge process according to the principal of a syphon in the first embodiment. Finally, as illustrated in FIG. 4D, there is no water in the water storage chamber 19 and the water discharge passage 30, and discharged water is stored in the water discharge tank 31. The water discharge tank 31 is removes from the heating cooker, and water stored in the water discharge tank 31 is disposed by a user. According to the above-mentioned water discharge according to the principal of a syphon, water in the water supply passage 27 around the water supply pump 28, which is located at upper stream side and the lower stream side relative to the water supply pump 28, is not discharged.

In the steam generator 20 according to the first embodiment, while there has been described an example where water is automatically discharged at every steam heating process, a manual water discharge mode can be provided to be able to discharge water according to the principal of a syphon when a user would like to clean up the steam generator 20.

As mentioned above, by discharging water according to the principal of a syphon, scale cohesion water or precipitated scales generated in the water storage chamber 19 and the first water discharge passage 25 flows out to the water discharge tank 31. However, scales precipitated in in the water storage chamber 19 during generating steam is likely to be introduced to the lower side of the water storage chamber 19 by the slope of the sloping surface 24 in the water storage chamber 19, and then deposited and accumulated in the first water discharge passage 25. If the water discharge passage would be formed by a metallic material, scales are gradually adhered to the inside of the water discharge passage in long term use in spite of discharging water, and thereby finally causing inability of water discharge, because scales are formed by inorganic substances such as calcium carbonate, magnesium carbonate or the like, which have a strong bonding force with metal. Accordingly, it causes the problem that scales are accumulated even in the water storage chamber, and steam generation cannot be performed.

In the steam generator 20 according to the first embodiment, since the first water discharge passage 25 of the water discharge passage 30 is formed by a silicone material, which has a weak bonding force with scales as against metal, there is no adhesion between scales and the first water discharge passage 25. Therefore, when water is discharged according to the principal of a syphon, scales can be removed from the first water discharge passage 25 easily and surely.

In the heating cooker according to the first embodiment, while the microwaves mode, oven mode, grill mode and steam mode can be performed independently, respective heating mode can be selectively combined to be performed with manual or automatic operation.

Figure 5A:
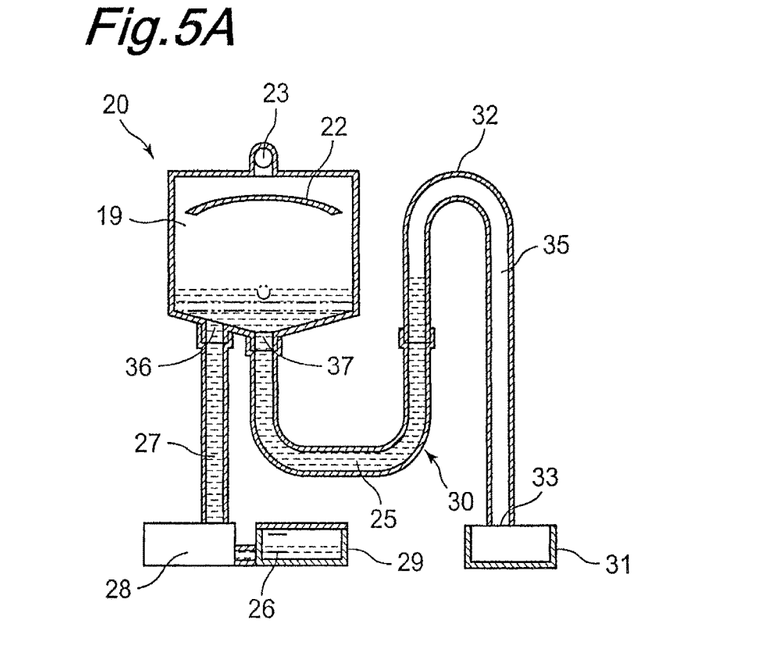
FIG. 5A is a cross-sectional view illustrating the first operation in the steam generator during the water discharge process for water in the water supply passage according to the first embodiment of the present invention.
Figure 5B:
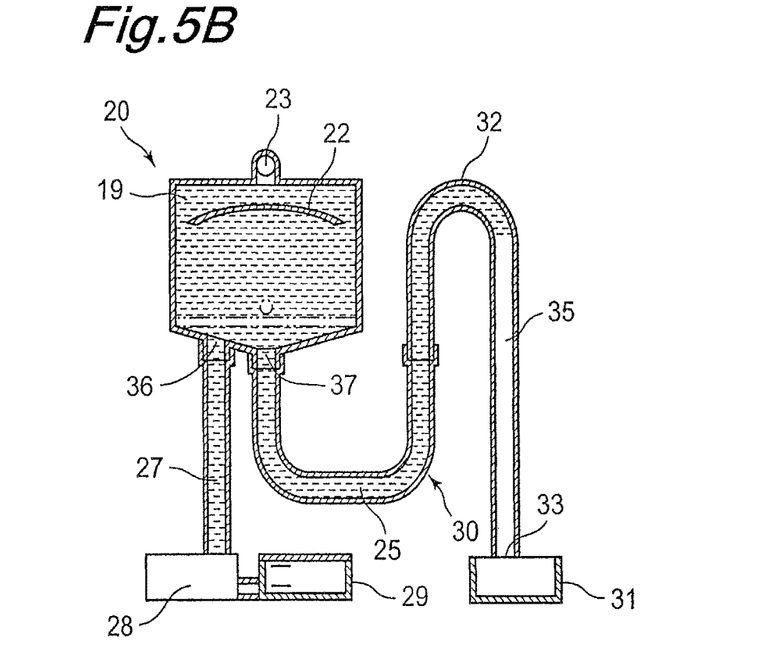
FIG. 5B is a cross-sectional view illustrating the second operation in the steam generator during the water discharge process for water in the water supply passage according to the first embodiment of the present invention.
Figure 5C:
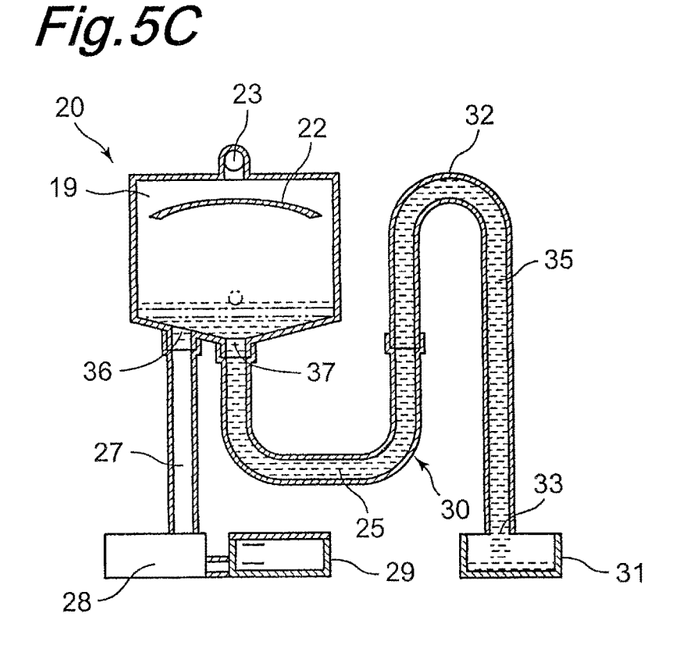
FIG. 5C is a cross-sectional view illustrating the third operation in the steam generator during the water discharge process for water in the water supply passage according to the first embodiment of the present invention.
Figure 5D:
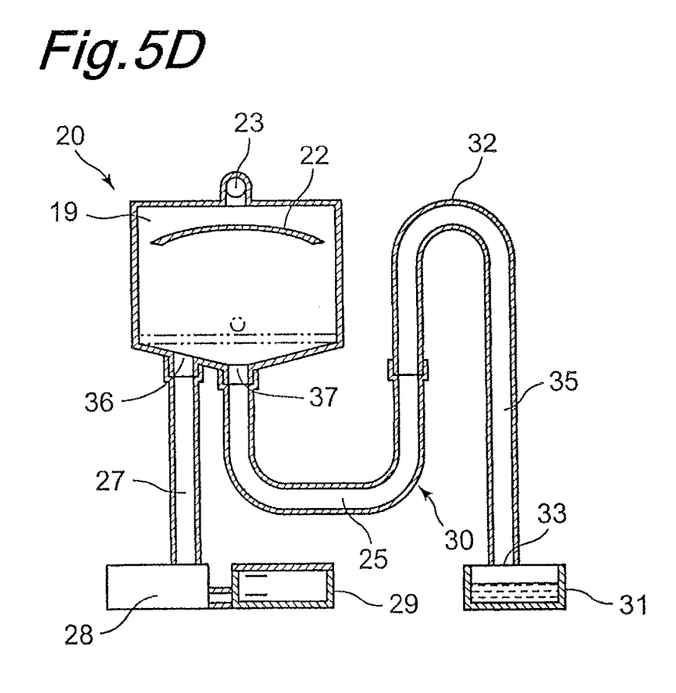
FIG. 5D is a cross-sectional view illustrating the fourth operation in the steam generator during the water discharge process for water in the water supply passage according to the first embodiment of the present invention.

FIG. 5A, FIG. 5B, FIG. 5C and FIG. 5D are cross-sectional views for describing water discharge process in the water supply passage 27 of the steam generator according to the first embodiment of the present invention. FIG. 5A illustrates the first operation in the steam generator during water discharge process for the water supply passage 27. FIG. 5B illustrates the second operation in the steam generator during water discharge process for the water supply passage 27. FIG. 5C illustrates the third operation in the steam generator during water discharge process for the water supply passage 27. FIG. 5D illustrates the fourth operation in the steam generator during water discharge process for the water supply passage 27.

When a user selects a water discharge mode and turns on a start switch after the user fills water in the water supply tank 29 up to the water discharge line 26 of the water supply tank 29, as illustrated in FIG. 5A, water in the water supply tank 29 is supplied to the water storage chamber 19 through the water supply passage 27 and the water supply port 36 by the water supply pump 28. Further, water is supplied continuously, as illustrated in FIG. 5B, the water level of the water storage chamber 19 and the water discharge passage 30 reaches the water discharge passage upmost point 32. Since the water supply tank 29 can contain water with the volume only about 10 ml more than the volume of water stored in the water storage chamber 19, there is almost no water in the water supply tank 29.

As illustrated in FIG. 5C, water is discharged to the water discharge tank 31 through the discharge port 37, the water discharge passage 30 and the water discharge passage outlet 33 according to the principal of a syphon. Even if water is discharged to the water discharge tank 31 as mentioned above, the water supply pump 28 operates continuously. Then, the water supply tank 29 becomes empty by the continuous operation of the water supply pump 28. Therefore, the water supply pump 28 supplies air to the water supply passage 27 instead of water. As a result, the water supply pump 28 pushes out the water in the water supply passage 27 into the water storage chamber 19 by the air, and thereby discharging water from the water discharge passage 30. Then, the water supply pump 28 stops after a predetermined period.

Finally, as illustrated in FIG. 5D, water pressed out into the water storage chamber 19 and the discharged water according to the principal of a syphon is merged, and the merged water is discharged toward the water discharge tank 31. Consequently, the water supply tank 29, the water supply passage 27, the water storage chamber 19 and the water discharge passage 30 become completely empty.

While the water discharge line 26 is provided in the water supply tank 29 in the steam generator 20 according to the first embodiment, it is also applicable that the indication of "10 ml" which is a required volume for discharging water, in the operational display portion 39, and thereby letting a user refill water into the water supply tank 29. If cleaning agent such as citric acid is used instead of water, it becomes easier to remove scales, water stains or the like. Therefore, the more cleanly steam generator can be provided.

As mentioned above, in the steam generator 20 according to the first embodiment, the followings are provided: the water storage chamber 19 which stores water, the steam generating heater 40 which heats water in the water storage chamber 19, the water supply pump 28 for supplying water to the water storage chamber 19 through the water supply port 36 provided in the water storage chamber 19 and the water supply passage 27, and the water discharge passage 30 for discharging water, in fluid communication with the discharge port 37 provided in the water storage chamber 19, which is formed by the first water discharge passage 25 having the U shape to be convex downward and the second water discharge passage 35 having the inverted U shape to be convex upward. The water discharge passage 30 is provided via the place (water discharge passage upmost point 32) to be located upper than the water level in the water storage chamber 19 during the normal heating process.

During the water discharge process, water stored in the water storage chamber 19 can be discharged to the water discharged tank 31 through the discharge port 37, the water discharge passage 30 and the water discharge passage outlet 33 according to the theory of a syphon, by raising the water level to the water discharge passage upmost point 32 in the water discharge passage 30 by driving the water supply pump 28 during the water discharge process. In the first embodiment, at least, the first water discharge passage 25 in the water discharge passage 30 is formed by a silicone material. Accordingly, in the first embodiment, since the first water discharge passage 25 in which scales are likely to be deposited and accumulated structurally is formed by a silicone material, a bonding force between the first water discharge passage 25 and scales tends to be weak. Accordingly, there is no adhesion between the first water discharge passage 25 and scales. Therefore, when water is discharged according to the principal of a syphon, scales can be surely removed from the first water discharge passage 25. Consequently, according to the configuration of the first embodiment of the invention, the steam generator whose steam generation performance is not lowered in spite of long term use can be provided.

Further, in the steam generator 20 according to the first embodiment, at least a nonmetallic portion of the first water discharge passage 25 in the water discharge passage 30 is configured such that visual observation can be achieved by using a transparent material, and a user can easily judge the water discharge condition. Therefore, the user opens the cover 42 of the heating cooker, and checks a degree of accumulation of scales in the first water discharge passage 25 visually, and then operates for discharging water. Accordingly, in the steam generator 20 according to the first embodiment, it can delete the useless activity such that water discharge process is performed in spite of the condition that scales have not been accumulated in the water discharge passage 30 in the case of using water with low hardness or the like. Therefore, water can be discharged by the theory of a syphon at a good and proper timing when water discharge process is necessary, and scales can surely be removed when the water discharge process is performed. Consequently, in the steam generator 20 according to the first embodiment, the steam generator with high reliability, whose steam generation performance is not lowered in spite of long term use can be provided.

Further, in the steam generator 20 according to the first embodiment, according to the configuration such that the first water discharge passage 25 is formed by using a non-metallic material and the second water discharge passage 35 is formed by using a metallic material in the water discharge passage 30, particularly scales are not adhered to the first water discharge passage 25 in which scales are likely to be accumulated, and the second water discharge passage 35 can be fixed easily and manufactured at low cost with configuration formed by bending a metallic pipe.

Further, according to the configuration such that the nonmetallic portion of the first water discharge passage 25 is formed by an elastic body, the discharge port 37 which connects the first water discharge passage 25 and the water storage chamber 19, and the connecting portion which connects the first discharge passage 25 and the second water discharge passage 35 can be achieved without using another parts such as a tube. Accordingly, the steam generator 20 according to the first embodiment can avoid water leakage or the like due to the increase of the number of parts, and thereby achieving the steam generator with high reliability which is manufactured at low cost.

Further, according to the configuration such that an inner surface of the first water discharge passage 25 is coated with a nonmetallic material to form the nonmetallic coating layer, it can prevent scales from being adhered to the water discharge passage 30 with a simple configuration, for example, even if a metallic material has to be applied to the first water discharge passage 25 with reasons of heat resistance or the like. Needless to say, if the above-mentioned coating layer is formed on an inner surface of the water discharge passage 25 formed by using a nonmetallic material, it can enhance heat resistance performance and reliability.

In the steam generator 20 according to the first embodiment, while one water storage chamber thermistor 34 is provided in the water storage chamber 19 to readily estimate the water level in the water storage chamber 19, it can adjust amount of the supplied water more accurately by providing a plurality of the water storage chamber thermistors 34 in the water storage chamber or by using a water level sensor to detect the water level in the water storage chamber 19 or the water discharge passage 30.

Further, in the steam generator 20 according to the first embodiment, there has been described an example where the water supply tank 29 and the water discharge tank 31 are formed separately, it can prevent a mistake of forgetting to set the water discharge tank 31 and prevent discharged water from dropping onto the floor by forming both tanks integrally. Further, by forming the water supply tank 29 and the water discharge tank 31 integrally, since the water discharge tank 31 is removed at the timing of refilling water in the water supply tank 29, it can prevent a mistake of forgetting to dispose the discharged water due to forgetting to remove the water discharge tank 31 as well as it can prevent the discharged water from overflowing from the water discharge tank 31 which is full of water.

Further, by providing a water discharge tank detection device which detects whether the water discharge tank 31 is set at the predetermined position or not, it can be configured such that water discharge process cannot be performed if a user forgets to set the water discharge tank 31, and thereby preventing water stored in the water discharge passage 30 from flowing out and dropping onto the floor.

In the first embodiment, since after completion of steam heating process, a water temperature in the water storage chamber 19 can be lowered at the same time when water is supplied for performing water discharge process according to the theory of a syphon, it can be configured such that water is actually discharged after performing natural cooling for a while until a water temperature in the water storage chamber 19 becomes a predetermined temperature or lower. This is because solubility of calcium carbonate as a kind of scales is higher if temperature is lower, and a user will not suffer from burns even if the user touches the water just discharged. It is preferable that a temperature of discharged water is lower, it takes, however, a longer time for cooling the water naturally if a temperature of the discharged water is made lower. Therefore, the temperature of the discharged water should be adequately determined considering a balance with the time for natural cooling.

While the present invention has been described according to the embodiments with a certain degrees of details, contents of disclosure of the embodiments shall be varied in details of the configuration, and the combination of elements and the change of order in the embodiment can be realized without deviating from the scope of the claims and concepts of the present invention.

INDUSTRIAL APPLICABILITY

A steam generator according to the present invention is applicable, as a cooking device to use steam, to various applications such as microwave ovens, oven function equipped microwave ovens, electrical ovens, rice cookers, thawing devices for business use or the like, and is a very useful device.

What is claimed is:

1. A steam generator comprising:
   a water storage chamber configured to store water;
   a steam generating heater configured to heat the water in the water storage chamber;
   a water supply device configured to supply water stored in a water supply tank through a water supply port in a bottom of the water storage chamber and a water supply passage connected thereto; and
   a water discharge line configured to discharge water stored in the water storage chamber to a separate water discharge tank, separate from the water supply tank,
   wherein the water discharge line includes a first water discharge passage having a convex downward U-shape that is in fluid communication with a discharge port in the water storage chamber, and a second water discharge passage having a convex upward inverted U-shape that is continuous with the first water discharge passage,
   wherein the steam generating heater is configured such that water stored in the water storage chamber is discharged through the discharge port and the water discharge line by a siphon effect, and the water supply device is configured to push up a water level of the water stored in the water storage chamber to an upmost point of the water discharge line located at a higher level than a water level in the water storage tank during a normal heating process, and
   wherein at least an inner surface of the first water discharge passage comprises a nonmetallic material having a weak bonding force with scale, such that scale is discharged in the first water discharge passage upon discharge of the water in the water storage chamber.

2. The steam generator according to claim 1, wherein at least the first water discharge passage of the water discharge line comprises a nonmetallic material having a weak bonding force with scale.

3. The steam generator according to claim 1, wherein at least the first water discharge passage of the water discharge line passage comprises a transparent nonmetallic material having a weak bonding force with scale, and the first water discharge passage is configured to allow visual observation of an inside condition of the first water discharge passage.

4. The steam generator according to claim 1, wherein the second water discharge passage comprises a metallic material.

5. The steam generator according to claim 1, wherein at least the first water discharge passage of the water discharge line comprises an elastic body of a nonmetallic material having a weak bonding force with scale.

6. The steam generator according to claim 1, wherein the first water discharge passage further comprises a nonmetallic coating layer on an inner surface.

7. The steam generator according to claim 1, wherein at least the inner surface of the second water discharge passage comprises a material different from the inner surface of the first water discharge passage.

8. A heating cooker including the steam generator according to claim 1.

9. A heating cooker including the steam generator according to claim 2.

10. A heating cooker including the steam generator according to claim 3.

11. A heating cooker including the steam generator according to claim 4.

12. A heating cooker including the steam generator according to claim 5.

13. A heating cooker including the steam generator according to claim 6.

* * * * *